United States Patent Office 3,335,022
Patented Aug. 8, 1967

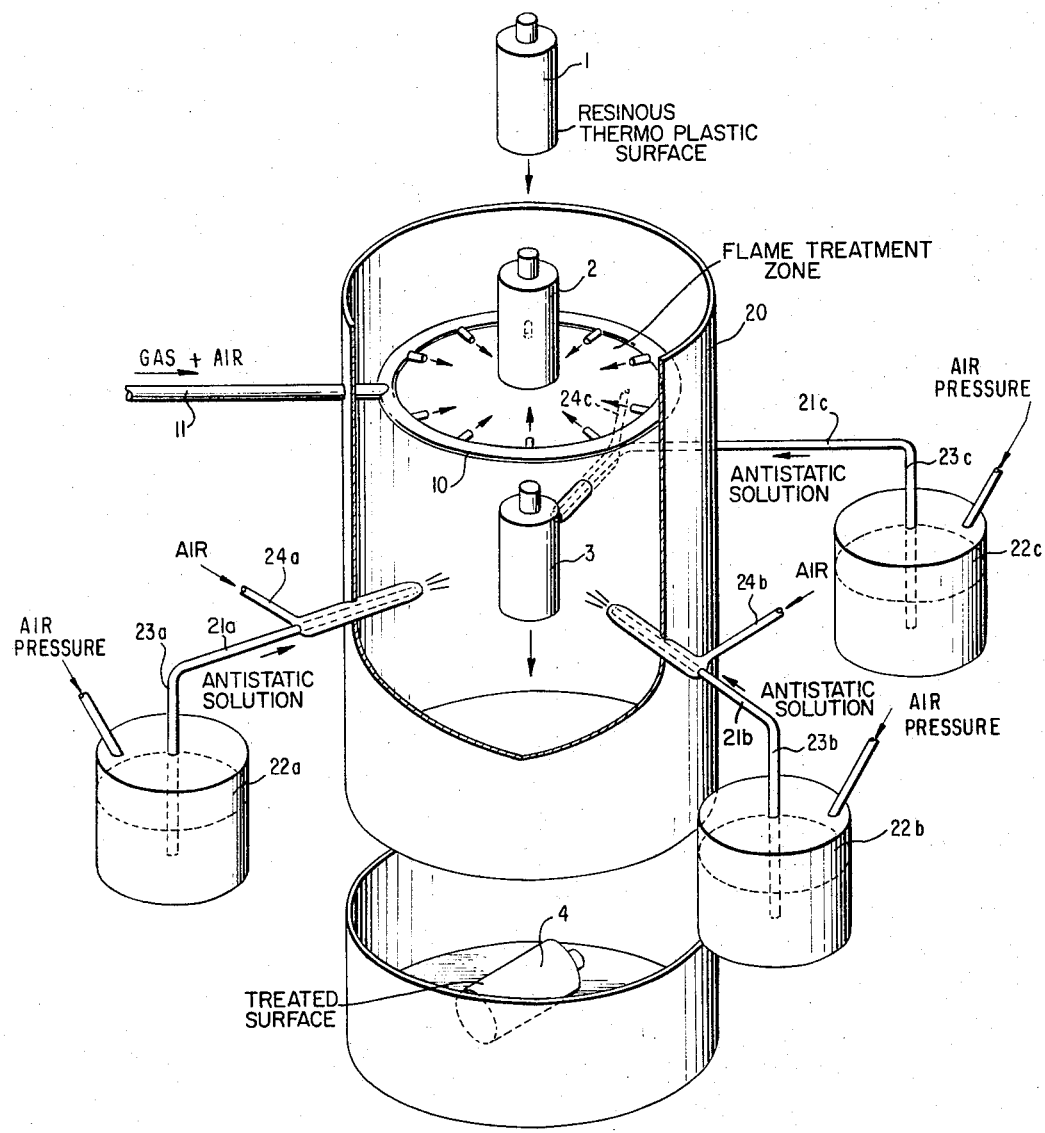

3,335,022
PROCESS FOR FLAMING AND DEPOSITING ANTI-STATIC AGENT ON A RESINOUS THERMOPLASTIC ARTICLE
Thomas F. Sincock, Simsbury, Conn., assignor to Monsanto Company, St. Louis, Mo., a corporation of Delaware
Filed Apr. 9, 1964, Ser. No. 358,556
8 Claims. (Cl. 117—46)

ABSTRACT OF THE DISCLOSURE

A process for treating a resinous thermoplastic surface to improve coating adhesion and antistatic properties, by simultaneously exposing the surface to an oxidizing flame and an ignited spray of an antistatic agent dispersed in a combustible liquid.

---

This invention relates to an improvement in the surface properties of articles made of thermoplastic resins. More particularly this invention relates to a treatment for making the surface of articles such as bottles or sheets of polyethylene or polypropylene both more receptive to ink or other coatings and less apt to accumulate an electrostatic charge.

It is well known that articles made of relatively non-polar thermoplastic materials such as polyolefin resins have a disadvantage in that they tend to build up an electrostatic charge. This phenomenon causes attraction of dust and dirt particles to the electrically charged polyolefin surface and in the case of plastic bottles or film not only impairs their esthetic appearance but tends to make them unsanitary. Furthermore, in some critical areas the accumulation of even a relatively slight electrostatic charge can represent an intolerable explosion hazard. Another significant disadvantage of polyethylene and similar materials is that their surfaces normally have a very low degree of receptivity for printing ink and for other decorative or protective coatings.

Vaious means have been proposed previously to overcome one or both of these disadvantages. Thus, the low dielectric constant of non-polar thermoplastic surfaces has often been increased in the past by applying thereto solutions of various known antistatic agents. It is likewise known to improve the adhesion of ink and the like to polyolefin surfaces by treating the surface by flame, by electrostatic corona discharge or with liquid chemicals such as sulfuric acid, mixtures of sulfuric acid and potassium dichromate and so on. While these treatments have been reasonably effective, each of them represents a fabrication step requiring special handling, with the result that the cost of the product is very substantially increased. This cost increase can be particularly significant if it is required to improve both the surface adhesion and the dielectric properties of a given article.

It is an object of this invention to provide an improved treatment for making the surface of thermoplastic articles both more receptive to coating compositions and at the same time also less apt to accumulate an electrostatic charge.

Another object is to provide a simplified process for making thermoplastic surfaces more adherent and more electrically conductive. These and other objects as well as the nature, scope and operation of the invention will become more clearly apparent from the following description.

The attached drawing schematically shows an apparatus arrangement suitable for the practice of the present invention.

It has now been discovered that a single step treatment can be used to make the surface of a thermoplastic article such as a polyethylene bottle or a polyethylene film more or less simultaneously antistatic as well as more receptive to coatings. More particularly it has been discovered, surprisingly, that polyethylene surfaces can effectively be treated with certain antistatic compositions while they are being flame treated to improve surface adhesion. Still more particularly it has been discovered that excellent antistatic properties can be imparted to a resinous thermoplastic surface by means of a surprisingly small amount of antistatic agent and that the adherent character of the former may be concurrently improved by means of otherwise conventional flame treatment on condition that the antistatic agent is applied in an essentially combustible form, e.g., in solution in a combustible organic solvent.

Flame treatment of non-polar thermoplastic resins such as low and high density polyethylene, polypropylene nylon and polystyrene, is well known. It has been practiced for many years to improve the receptivity of such resins for printing ink or other decorative or protective coatings such as those based on epoxy resins, vinylidene chloride copolymers, nylon, etc. In such flame treatment an oxidizing flame modifies the hydrophobic nature of the thermoplastic surface by what appears to be surface oxidation. For instance, suitable methods and apparatus for the flame treatment of thin polyethylene film are described in the Loukomsky Patent No. 2,767,103 and in the Grow et al. Patent No. 2,795,820. Similar treatments can of course be applied to the surface of polyolefin bottles. Indeed, in the latter case the treatment is easier to carry out as more latitude in intensity of exposure is permissible in the case of relatively heavy gauge articles such as plastic bottles which may have a wall thickness of at least about 0.5 to about 2 mm. or more than in the case of thin gauge film since such film will melt and distort if heated too high throughout.

In the case of thermoplastic bottles or similar molded articles surface flame treatment satisfactory for the present purposes can be obtained simply by passing them in a known manner through the flame zone of a conventional ring burner or through a circular zone defined by a plurality of individual gas burners. Suitable fuels for such burners include propane, butane, mixtures thereof such as natural gas, etc., the fuel being mixed with air or oxygen preferably in proportion to produce an oxidizing flame and a flame temperature of at least about 2000° F. and up to about 4000° F., excellent results being obtained at flame temperatures of about 2100° F. Flame temperatures substantially below 1900° F., such as those produced by combustion of ethanol-air mixtures, do not normally produce the desired degree of plastic surface modification. The conveying of the bottles or other articles through the flame zone can be effected simply by letting them drop freely through the flame zone or, if longer exposure is desired, they can be slid down an inclined chute or ramp or they can be conveyed on a mechanical conveyor passing through the flame zone at a preselected rate of speed.

In accordance with the present invention such otherwise conventional flame treatment is modified by combining it with the simultaneous application of the antistatic agent, a solution of the latter in a combustible solvent being sprayed onto the thermoplastic article substantially while it is being flame treated. To do this, a suitably designed circular spray nozzle or a plurality of individual nozzles is used to produce a spray encompassing as much of the circumference of the article being treated as one may wish to make antistatic. Thus, if the entire circumference of a bottle is to be rendered antistatic, the antistatic solution should be sprayed all around it either by use of a circular spray head or by use of a plurality of suitably disposed spray nozzles. On the other hand, if one side of a bottle or other articles is to be completely printed over or otherwise provided with an extraneous coating, then it is sufficient to apply the antistatic liquid in the flame zone only to the portion of the circumference which will remain uncoated.

Though all but a trace of the antistatic agent may be consumed by the flame when operating according to this invention, it has been found that sufficient antistatic agent survives the flaming step to impart the desired antistatic properties to the treated thermoplastic resin surface. Apparently the freshly flame treated resin surface can be made antistatic more readily than an untreated resin surface or a surface that was treated but to which the antistatic agent was not applied immediately. As a possible explanation it is suggested that flame treatment produces in the treated surface some free radicals or other chemical groups which in their nascent state readily form an effective bond with the antistatic agent. On the other hand, when the antistatic agent is applied to an untreated surface or to a surface which has been flame treated or otherwise oxidized but wherein the nascent reactive centers have been allowed to decay or become exhausted by other reactions before the antistatic agent is applied thereto, the utilization of the antistatic agent is less effective.

For purpose of the present invention, the antistatic agent is supplied as an atomized spray of combustible liquid, e.g., as a solution in a commonly available combustible solvent in a concentration of about 0.5 to 10%, e.g., 3 to 7%. The solution is desirably applied to the thermoplastic surface at a rate calculated to supply from at least about 0.1 to about 0.5 mg., preferably 0.15 to 0.20 mg., of active agent per square inch of surface being treated, disregarding in such calculations any combustion. Of course, in calculating the required liquid spray rate allowance should be made for the rate at which the bottles being treated pass through the spray zone. Thus, assuming that about 50% of the antistatic solution is wasted when bottles are being fed through the spray zone at the rate of 60 per minute and the solution is supplied there as a continuous spray a greater portion of the sprayed solution will be wasted if the bottles are fed at a lower rate.

A wide variety of commercially available antistatic agents can be used for application in the process of the present invention. Typical, for instance, are the alkyl substituted quaternary ammonium salts corresponding to the formula $$[R_1-\underset{\underset{R_4}{|}}{\overset{\overset{R_2}{|}}{N}}-R_3]^+An^-$$

wherein $R_1$ is a long-chain fatty radical such as an alkyl or an acetylamidoalkyl group of about 10 to 20 carbon atoms, e.g., decyl, octadecyl or stearamide-propyl; and $R_2$, $R_3$ and $R_4$ are the same or different lower alkyl or substituted alkyl groups of 1 to about 20 carbon atoms, e.g., $C_1$ to $C_3$ groups such as methyl, ethyl, propyl, β-hydroxyethyl, or fatty radicals the same as or similar to $R_1$. The anion $An^-$ of such a salt is preferably a chloride, but salts wherein the anion is a sulfate, nitrate, phosphate, acetate, hydroxyl and the like are similarly useful. Of these compounds the ammonium chloride salts wherein $R_2$, $R_3$ and $R_4$ are methyl groups and $R_1$ is based on the higher animal oils such as tallow, e.g., the "Arquad 2HT" product made by Armour & Company and "Aliquat" made by General Mills, are particularly effective. Other known antistatic agents which are illustrative of this class of compounds include "Catanac SP" (stearamido-propyl di-methyl β-hydroxy ethyl ammonuim phosphate) and "Catanac SN" (stearamido-propyl di-methyl β-hydroxy ethyl ammonium nitrate).

Other classes and specific examples of useful antistatic compounds include the following:

Fatty acid alkanol amides corresponding to the formula

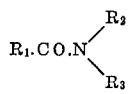

wherein $R_1$ is an alkyl radical of about 11 to 22 carbon atoms such as undecyl or docosyl and $R_2$ and $R_3$ are alkanol radicals of 1 to about 3 carbon atoms such as hydroxyethyl or hydroxypropyl, a typical compound of this class being lauric diethanolamide ("Monamid 150LWA").

Polyoxyethylene sorbitan incompletely esterified with a higher fatty acid such as lauric, palmitic or stearic acid, wherein the polyoxyethylene part of the molecule contains about 2 to 10 ethylene oxide groups; e.g., the polyoxyethylene (4) sorbitan monostearate known in the trade as "Tween 61."

Polyethylene glycols containing from about 4 to about 15 ethylene oxide units and a molecular weight under 1000; e.g., the polyethylene glycol having a molecular weight of about 350 which is known as "Carbowax 350."

Polyethylene glycol monoesters of higher fatty acids such as the monostearate of a polyethylene glycol having a molecular weight between about 200 and 1000, e.g., the monostearate of polyethylene glycols 600.

Imidazolene-fatty acid condensates such as the monazolines corresponding to the formula:

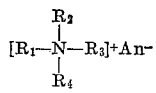

wherein $R_1$ is a short chain radical such as β-hydroxyethyl and $R_2$ is a fatty radical of not less than 8 carbon atoms, e.g., lauryl.

Ethylene oxide-amide condensates such as the "Ethomid" brand of agents corresponding to the formula

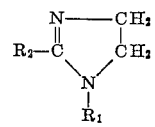

and ethylene oxide alkyl amines such as the "Ethomeens" corresponding to the formula

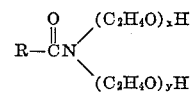

R being stearyl or a similar chain derived from tallow, soybean oil or coco oil.

Alkali metal or ammonium salts of ethoxylated alkyl phenols having an alkyl group of about 6 to 12 carbon atoms and containing 2 to about 12 ethylene oxide units, e.g., "Triton"

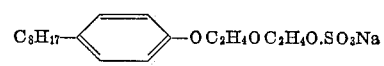

or "Alipal CO-436"

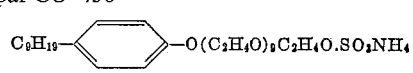

Ethoxylated nonyl or octyl phenols containing a chain of 4 to 20 ethylene oxide groups per molecule.

Ethoxylated alkyl phenol phosphate esters such as those corresponding to the formula

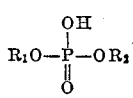

wherein $R_1$ and $R_2$ are ethoxylated alkyl phenol groups such as octyl or nonyl phenol condensed with about 10 ethylene oxide groups.

Solvents suitable for use in the present invention include normally liquid hydrocarbons, especially paraffins of about 5 to 10 carbon atoms; alkanols of 1 to about 12 carbon atoms such as methanol, isopropyl alcohol, amyl alcohol, ethylhexanol, etc., esters such as ethyl acetate or amyl acetate and generally any solvent or mixture of solvents that is combustible in air and is capable of dissolving a sufficient amount of the particular antistatic agent selected.

An operation exemplary of the present invention will now be described employing the apparatus assembly illustrated in the attached drawing. Referring to the drawing, this apparatus comprises as its principal elements a ring burner 10 to which natural gas or similar gaseous hydrocarbon fuel can be fed through line 11, and three spray nozzles or guns 21a, 21b and 21c which are spaced about 120° apart, all of said nozzles being aimed substantially toward a point on the vertical axis passing through the center of burner 10. A suitable antistatic liquid such as a 5% solution of lauric acid diethanolamide in methanol is supplied to the nozzles from pressurized containers 22a, 22b and 22c via tubes 23a, 23b and 23c. Atomizing air can be supplied to the nozzles via conduits 24a, 24b and 24c. For optimum effectiveness, the antistatic spray heads are preferably arranged a small distance such as about 1 to 5 inches, e.g., 3 inches, below the ring burner as spraying an alcohol solution directly into the burner ring tends to reduce the flame temperature of the ring below that desired for effective flame treatment while placing the spray guns too far away from the burner ring results in an unnecessarily tall flame and in some instances can result in less effective antistatic properties. Of course, when burner 10 is ignited and the spraying operation through spray guns 21 is begun the resulting spray will ignite also. As a result, the spray will not be wet on the bottles being treated according to this invention and no separate drying step is required.

A chimney stack 20, shown in the drawing in partially cut-off section, is preferably disposed around the ring burner 10 and around the tips of the spray nozzles 21, extending above and below the nozzles. The chimney is provided with holes to allow the spray cones of each spray nozzle to enter into the interior of the chimney. The chimney prevents undue billowing of the flame and contains any liquid overspray. The spray guns, such as Binks Model 21 guns fitted with 12 inch extensions, can be effectively operated, for instance, at a fluid pressure of about 10 p.s.i.g. and an atomizer air pressure of about 18 p.s.i.g. However, other spray arrangements such as conventional Hago oil burner nozzles having a rated capacity of 0.5 gal. per hour at 100 p.s.i.g. can be employed similarly.

When treating sixty 12-ounce bottles per minute by flaming and spraying with a 5% solution of lauric acid diethanolamide in methanol as just described, treatment costs but a small fraction of a cent per thousand bottles and results in bottles that have excellent receptivity to coatings as well as satisfactory antistatic properties.

When operating as illustrated in the drawing, as the bottles to be treated are released from station 1 they pass in rapid sequence through the flame of ring burner 10 as shown at 2 and through the ignited spray of antistatic solution as shown at 3 before finally dropping into a storage container as shown at 4. The treated bottles can then be subjected to additional manufacturing operations such as coating, lining or printing steps and finally packaged for shipment to users.

To demonstrate the effectiveness of the present invention, a series of six runs was performed in the described equipment, using standard commercial grade bottles of 12-ounce capacity. The bottles were made of high-density polyethylene which was pigmented white by titanium oxide. The bottles from the several runs were tested for static decay and for quality of surface modification. The six runs were as follows:

Run 1, regular flame treatment only; no antistatic spray.
Run 2, regular flame treatment plus antistatic spray.
Run 3, ring burner 10 shut off (no regular flame treatment); bottles passed through ignited spray.
Run 4, ring burner 10 shut off; bottles passed through unignited spray.
Run 5, bottles conventionally flame treated in a separate operation passed through ignited spray.
Run 6, bottles conventionally flame treated in a separate operation passed through unignited spray.

The flame treatment in Runs 1, 2, 5 and 6 was produced by combustion of natural gas, yielding a flame temperature of about 2100° F. as determined by an optical pyrometer. Average residence time of the bottles in this flame zone was about 0.5 second.

The antistatic solution used in Runs 2–5 was a solution consisting of 5 weight percent of lauric diethanolamide in methanol and was sprayed into the treating zone at a total rate between about 0.15 to about 0.35 lb./min., generally at about 0.25 lb./min.

The static decay of the treated bottles was measured by inducing a static charge on test panels cut out from representative bottles. In this test the charge is induced by rubbing the panel 10 times from top to bottom with a clean fresh paper towel and placing the charged panel quickly before the probe of a static meter (Keithley Model 210), the probe being mounted in a jig such that each panel is placed in the same position and equidistant during reading. The charges at 0 time and after a decay of five minutes are recorded. In some instances the antistatic properties of sample bottles were also tested by submitting them to a standard dust box test.

Receptivity of the treated bottles to ink was tested by an adhesion test. In this test unrubbed panels are painted with a green nitrocellulose base ink, allowed to dry in air, and tested for adhesion by applying a strip of cellophane adhesive tape which is then removed with a rapid pull.

The following test criteria were used:

*Static decay*

Excellent, initial charge not over 1.0 kv. decaying to 0 in 5 minutes or less.
Good, initial charge not over 1.5 kv. decaying to 0.5 to 0.75 kv. in 5 minutes or less.
Fair, initial charge not over 3.0 kv. decaying to 1.5 kv. in 5 minutes or less.
Poor, initial charge over 3.0 kv. decaying to half-life in over 5 minutes.

*Adhesion*

Excellent, less than 10% ink removal.
Good, 10 to 20% removal.
Fair, 20 to 40% removal.
Poor, 40 to 100% removal.

The following results were obtained:

| Run No. | Treatment | | Antistatic Properties | Adhesion |
|---|---|---|---|---|
| | Flame | Spray | | |
| 1 | Yes | No | Very Poor | Excellent. |
| 2 | Yes | Yes [1] | Good | Do. |
| 3 | No | Yes [1] | Fair | Poor. |
| 4 | No | Yes [2] | Excellent | Do. |
| 5 | Yes [3] | Yes [1] | Good | Good. |
| 6 | Yes [3] | Yes [2] | Excellent | Do. |

[1] Ignited Spray.
[2] Unignited Spray.
[3] In separate pretreatment.

The following conclusions can be drawn from these tests:

Flame treatment alone is ineffective in producing antistatic properties (Run 1).

Application of wet unignited spray to either an otherwise untreated bottle or to a bottle flame treated in a separate previous step produces excellent antistatic properties (Runs 4 and 6), but the spraying alone (Run 4) produces a bottle with unsatisfactory adhesion properties.

Passage of an otherwise untreated bottle through an ignited spray without proper flame treatment gives fair antistatic properties but poor adhesion test results (Run 3). Apparently the temperature of the flame produced by the ignited spray alone is insufficiently hot to produce the desired surface modification. The antistatic properties themselves are also much less satisfactory in this case (Run 3) than when the antistatic spray treatment is preceded by a flame treatment wherein the surface adhesion properties of the polyethylene surface are properly improved (Runs 2 and 5).

The bottles from all of the runs showed about equally good environmental stress crack resistance, excellent impact properties and no significant change in capacity as a result of the treatment.

The scope of the present invention is particularly pointed out in the appended claims. It is obvious that many variations may be made in the products and processes set forth above without departing from the spirit and scope of this invention.

What is claimed is:

1. A process for the surface treatment of a resinous thermoplastic article to improve its surface adhesion and antistatic properties in a one-pass operation which comprises passing said article through a treating zone wherein it is exposed substantially concurrently to a flame formed by burning a mixture of a hydrocarbon fuel and an oxygen-containing gas having a flame temperature of at least about 2000° F. and to an ignited spray of an antistatic agent which is supplied to said zone dispersed in a finely atomized combustible liquid.

2. A process according to claim 1 wherein said article is passed through said treating zone in a downward direction and wherein said ignited spray is immediately subadjacent to said burning hydrocarbon flame.

3. A process according to claim 2 wherein the antistatic agent is a quaternary ammonium salt having a cation corresponding to the formula

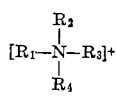

wherein the radicals $R_1$, $R_2$, $R_3$ and $R_4$ are selected from the group consisting of alkyl and substituted alkyl groups of 1 to about 20 carbon atoms, at least one of said radicals being a fatty radical of 10 to 20 carbon atoms.

4. A process according to claim 2 wherein the antistatic agent is a quaternary ammonium chloride wherein the quaternary ammonium ion contains one tallow radical and three methyl radicals.

5. A process according to claim 3 wherein the antistatic agent is introduced into the process as a solution in an alkanol having 1 to about 5 carbon atoms per molecule.

6. A process for the surface treatment of a molded polyethylene article having a wall thickness of at least 0.5 mm. to improve its surface adhesion and antistatic properties in a one-pass operation, which comprises passing said article downwardly through a treating zone wherein it is exposed in immediate sequence first to a flame having a flame temperature of between about 2000° and 4000° F., said flame being formed by burning a mixture of a gaseous hydrocarbon fuel and air, and then to an ignited spray formed in a portion of said zone subadjacent to the aforesaid hydrocarbon flame by spraying into said zone portion an antistatic solution containing about 3 to 30% by weight of an alcohol-soluble antistatic agent in a $C_1$ to $C_3$ alkanol.

7. A process according to claim 6 wherein said antistatic solution is a solution of lauric diethanolamide in methanol.

8. A process according to claim 7 wherein said antistatic solution is sprayed into said treating zone at a rate calculated to provide from about 0.1 to about 0.5 mg. of antistatic agent per square inch of polyethylene surface being treated.

References Cited

UNITED STATES PATENTS

| | | | |
|---|---|---|---|
| 2,683,894 | 7/1954 | Kritchever | 117—47 |
| 2,952,560 | 9/1960 | Wilkalis | 117—47 |
| 3,028,257 | 4/1962 | Svrchek et al. | 117—46 |
| 3,088,844 | 5/1963 | Hungerford et al. | 117—46 |
| 3,255,034 | 6/1966 | Covington et al. | 117—46 |

MURRAY KATZ, *Primary Examiner.*